P. G. Gardiner,
Making Car Springs.
Nº 16,793.    Patented Mar. 10, 1857.
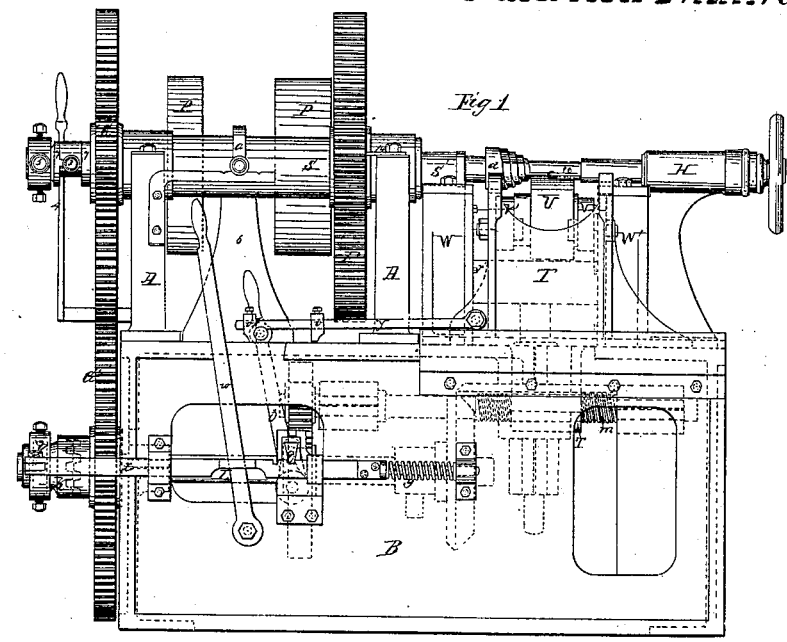
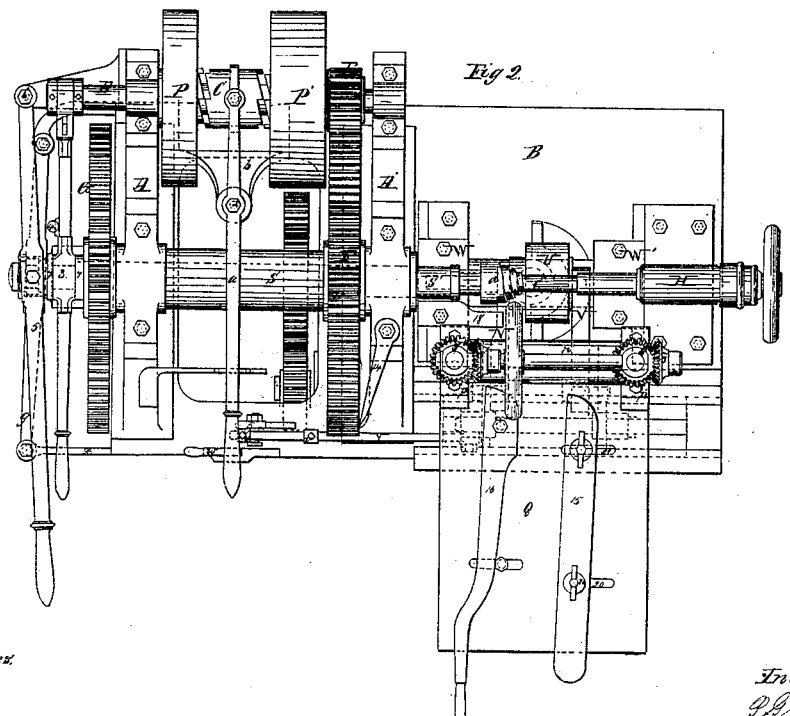

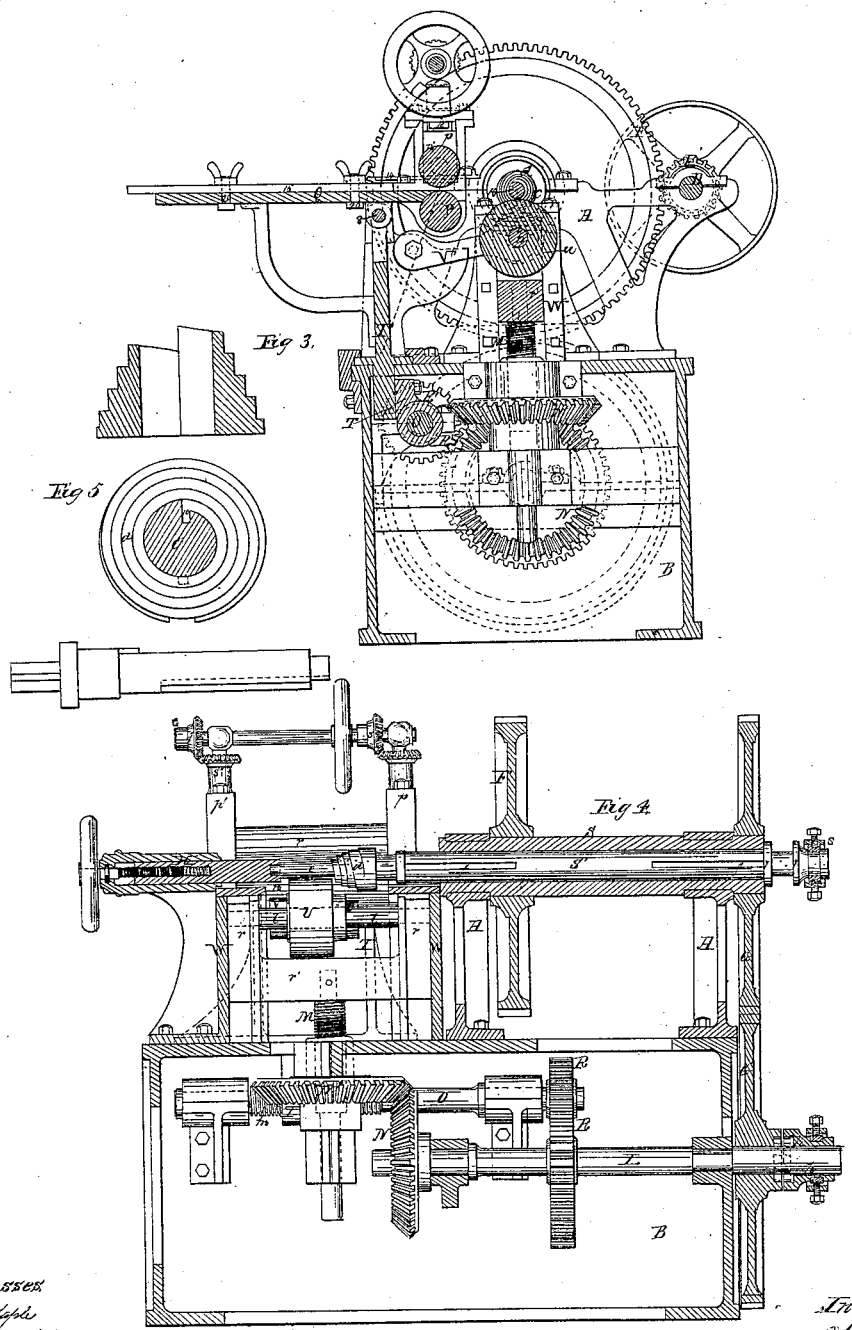

UNITED STATES PATENT OFFICE.

PERRY G. GARDINER, OF NEW YORK, N. Y.

MACHINE FOR COILING STEEL SPRINGS.

Specification of Letters Patent No. 16,793, dated March 10, 1857.

*To all whom it may concern:*

Be it known that I, PERRY G. GARDINER, of the city, county, and State of New York, mechanical engineer, have invented a new and useful Machine for Converting and Coiling Steel Plates into Regularly-Shaped Spiral-Coned Coils for Springs for Railway-Cars and other Uses; and I do hereby declare the following to be a full and exact description of said machine and of the manner of operating the same, reference being had to the drawings accompanying and making part of this my specification.

In the accompanying drawings—Figure I, represents a front view or elevation. Fig. II, a top view or plan. Fig. III, a cross vertical section. Fig. IV, a longitudinal vertical section. Fig. V, a cross section of the mandrel and spiral cone upon which the coil is made.

In all the figures, like letters represent like parts.

The nature of my invention consists in the construction of a mandrel and spiral cone together, and connecting and combining this instrument with feed, pressure, guide and other machinery in such a manner that by the revolution of the mandrel and cone and the operation of other parts of the machinery, a steel plate of the proper dimensions shall by one continuous movement of the machine be converted into a regularly shaped conical coil having equal spaces preserved between the different coils throughout, and having also an even base and apex, so as that it can be formed by annealing and tempering into a spring, thus making the coil of the spring more evenly, perfectly, and better adapted to tempering as well as the purposes of a spring than has heretofore been done and also producing the coil much more rapidly and evenly than has before been done.

In the accompanying drawings A. A' are standards erected upon and fastened to the bed frame B, and provided with suitable bearings for the hollow shaft S and likewise with bearings for the driving shaft D.

P P' are loose pulleys on the shaft D arranged with a clutch C between them working upon a feather let into the driving shaft. These pulleys are connected with a counter shaft through belting in such a manner that they are carried around in opposite directions, for the purpose of turning the machine in different directions according as the clutch C is connected with the one or the other pulley. The clutch C is operated through the lever (a), turning on a center (2) fast to the bracket (b).

E, is a pinion fast on the driving shaft D, and geared in the wheel F fast on the hollow shaft S. Through this hollow shaft S, a spindle S' passes projecting on both sides and connected with the hollow shaft by means of feather f, let into the spindle S', and fitted into corresponding grooves in the hollow shaft S, and capable of sliding in and out. Any motion communicated therefore to the hollow shaft S will be communicated to this spindle S', on the inner end of the spindle S', the mandrel (c) with the spiral cone (d) is attached by means of a feather, and is so arranged as to be easily put in or taken out. The other end of this mandrel is held steady by means of the head stock spindle H, arranged and operated in the usual manner similar to a turning lathe. The mandrel and spirally cut cone are made in separate pieces. The cone sliding on and off the mandrel as required for the purpose of taking off the coil when finished. The spiral cone has upon its inner surface a slot to fit a feather upon the mandrel which holds the two fast united into one, when in operation. The straight part of the mandrel is an eccentric; it has a slot which begins at the point where the spiral cone begins to form and runs straight off to the opposite end of the mandrel; one side of this slot is higher than the other by a difference equal to the thickness of the plate of steel of which the spring is to be made; and the side of the slot opposite to the highest side is slightly thrown back at the lower part so that the slot presents on this side a slightly inclined face, and is thus made to present an edge which fits and catches into a crease made upon the upper surface of the steel plate near the end, and thereby holds the plate firmly in the mandrel while it is coiled; and the crease at the same time permits the short bend which is made in the plate at the first turning of the mandrel, to be formed without breaking the steel plate.

A cross section of the mandrel and cone is seen in Fig. V., the arrow representing the direction in which the mandrel turns while the coil is being made. When the coil is finished the mandrel and cone are removed from their place, and the coil adheres to them; and the coil is removed from the mandrel by a separate machine which at the same time that it removes the mandrel also separates the cone from the mandrel and either turns back the small portion of the steel plate which was held in the slot or breaks it off, so that it does not project into the center of the coil. The spindle S' is held in its position by means of the lever (3) fitted between collars (7, 7) on the outer end of said spindle, and acted upon by the spring lever (4). When the spindle S' requires to be moved inward or outward the lever (3) is pushed upward when by the action of the lever (5) turning on the fixed center (6) and connected with the end of the spindle S' by means of a universal joint, this spindle can be moved outward for the purpose of taking out the mandrel or moved inward after the mandrel is put in place again.

G is a wheel fast on the outer end of the hollow shaft S' and working into a corresponding wheel G' loose on the shaft L and situated directly underneath the shaft S'. This shaft L has in its outer end a sliding clutch K working upon a feather ($h$) let into the shaft and acted upon by the lever ($g$) so as to be thrown in or out of gearing with a corresponding clutch firmly attached to the loose wheel G' thereby connecting this loose wheel G' with the shaft L and communicating motion to the same, or stopping said shaft L when required. On the end of the shaft L a bevel wheel N is attached geared into a corresponding bevel wheel N' which latter works upon the screw spindle M in such a manner as to raise or lower said spindle and every thing attached to the same according to the motion of the machine.

O is a shaft running parallel with the shaft L and connected with the same through the gear wheels R R'. On the other end of this shaft a screw thread ($m$) is cut, upon which the nut T' works and which nut is thereby, together with every thing attached to it moved backward or forward according to the motion of the machine.

T is a sliding frame situated in front of the mandrel ($c$) and moving in suitable slides attached to the frame B. The lower end of this sliding frame passes through the frame B and is fastened to the nut T' receiving thereby any motion communicated to the nut.

Q is a table attached to the sliding frame T by a bolt (8) passing through projecting pieces attached to the sliding frame, and to the under side of the table, so that the table may turn up from a horizontal position to one considerably inclined so as to keep the steel plate at the right inclination as it is drawn in upon the cone.

$n$, $n'$ are rollers turning in suitable bearings $p$, $p'$ fast in the upper side of the table Q. The upper roller $n'$ is so arranged as to approach or recede from the roller $n$ by means of the screws K operating in the slide bearings at either end of the roller $n'$ by means of the bevel gear $s$, $s'$ and $s''$, $s'''$; this is for the purpose of adjusting the space between the rollers to the thickness of the steel plate.

V, V' are two arms attached to and projecting from the sliding frame T, and so fixed upon a pin or pivot that the opposite ends of the arms may move upward or downward. The loose ends of these arms embrace the ends of the roller U, in such a manner as to communicate to this roller the same side motion as that of the sliding frame T, but at the same time allowing the roller U, its upward and downward motion. The axle ($l$) of this roller U runs in bearings $r$, $r$ which are connected together by the brace $r'$ and are capable of sliding up or down in suitable recesses in the frames W, W'. The screw spindle M is firmly attached to the brace $r'$ and communicates thereby through said brace an up or down motion to the roller U. The lever $g$, which operates the sliding clutch K, is connected with a rod $x$, acted upon by a spiral spring $g$, the action of which always forces the sliding clutch K, out of gearing with the loose wheel G'.

$w$, is a lever connected also with rod $x$ and through which the sliding clutch K is moved into gearing with the clutch fast on the loose wheel G' when required.

($z$) is a lever connected with a catch or pawl ($g$) and acted upon by the stops $v$ or $v'$ fast on the rod $y$, but adjustable upon it, and which rod $y$ is fastened to the sliding frame T, and receives motion from it. By the action of the catch or pawl ($g$) the rod $x$ is kept fast and the sliding clutch K kept in gearing with the wheel G' until either of the stops $v$, or $v'$ throws the pawl $g$ out of the notch in the rod $x$, when the action of the spiral spring $y$ acts upon the rod $x$ and through the lever $g$ upon the sliding clutch so as to throw the clutch out of gearing, by which operation the shaft L and every thing connected with it will be instantaneously stopped.

The operation of the machine is as follows: The machine is turned or adjusted so that the slot in the mandrel is in a line with the face of the table T which position is marked upon the side face of the wheel F, and pointed to by the pointer (14) secured to the top of the frame A'. A steel plate of equal width and thickness (except that an angular strip is cut off from the sides near either end in order to form a flat and even base and top for the spring), is then (in a heated state) put upon the table T against a guide plate (15) and which guide plate is made adjustable by screws passing through it, and slots in the table as seen at (20);

and which guide plate is adjusted and fastened upon the table T so as to give the inclination to the steel plate which it requires to be drawn and coiled accurately upon the cone; the steel plate is also further regulated and guided by the handle (16) turning upon a pivot (12) fast upon the table. The steel plate is then forced through between the rollers, $p$, $p'$ into the slot (10) in the mandrel, the crease in the plate above described being uppermost, so that the steel plate is tight in the slot. The sliding clutch K is then thrown into gear with the wheel G' connecting thereby the lower shaft L with the upper shaft S'; and the machine is then set in motion through the clutch C being thrown in connection with the pulley P, the revolution of the mandrel being as shown by the arrow so as to turn the steel plate first upon the lower or depressed portion of the mandrel. The steel plate being held fast in the mandrel by the slot and the crease above described, will by the revolution of the spindle. S' (to which the mandrel is attached by the feather and slot) be wound first upon the mandrel and then upon the cone ($d$) by the simultaneous sliding movement of the sliding frame T, carrying with it the roller U; being moved forward by the action of the screw shaft O on the nut T' fast to the sliding frame, and this motion is proportioned to the pitch of the cone mandrel ($d$) upon which the steel plate is to be coiled and to the size or diameter of the spring; and as the table Q is connected to said sliding frame the steel plate will thereby be moved forward in the same proportion.

The pulley or roller U which is fixed at a distance from the circumference of the cone mandrel just equal to the thickness of the steel plate and the distance of the coils apart, acts as a pressure roller, bending and pressing the steel plate upon the mandrel, and receives at the same time in connection with its lateral motion communicated to it through the sliding table T a motion downward through the action of the screw spindle M worked by the bevel wheels N W, which downward motion is exactly equal to the gradual increase of the circumference of the cone mandrel; by which means the roller U is always kept the exact distance required from the face of the cone mandrel, pressing thereby the steel plate, while being coiled, upon the cone mandrel equally the whole time. A guide plate (18) is fastened to the frame W to guide the end of the steel plate after the plate has left the table Q. When the steel plate is all wound upon the cone mandrel and the spring is so far finished, the stop $v$ on the rod $y$ acts upon the lever $z$ by which the pawl $g$ is pushed out of the notch on the rod $y$ when the sliding clutch K is forced away from its connection with wheel G' by the action of the spiral spring upon the rod $x$ as before described, and thus the shaft L together with every thing connected with it is stopped; the clutch C is now disconnected from the driving pulley P, by which the machine is stopped. The sliding clutch K is now thrown into gear again with the clutch in the wheel G' and the clutch C is thrown into gear with the pulley P' (moving in a direction opposite to that of P as above mentioned) when the machine moves in the reverse direction to that which it had when coiling the plate, by which the sliding frame is moved back again as well as the pressure roller U moved gradually upward following exactly at the proper distance the surface of the cone mandrel. When the sliding frame has arrived at its original position the stop V' comes in contact with the lever L throwing thereby the pawl $g$ out of gear when the clutch K will be forced out of gearing again; the clutch C is then moved away from the pulley P' and the machine stops. The lever 3 will now be thrown out of gear with the spindle S' and the spindle moved outward by the action of the lever 5, when the mandrel with the coil upon it can be removed from the machine. The coil being removed from the mandrel and the mandrel again put into the spindle S', this spindle is moved back again into its proper position and the machine put into the right position so that the pointer 14 comes opposite the mark upon the side face of the wheel F,—another steel plate is introduced,—and the operation of coiling is performed as before.

Having thus described my machine and the manner of constructing and operating the same what I claim as my invention therein and which I desire to secure by Letters Patent is—

1. The cone mandrel $c$, $d$, constructed in two pieces so that the spiral cone will slide off and upon the straight part of the mandrel the straight part having the slot or groove, and being an eccentric, so that one edge of the slot will be lower than the other and gradually rising around to the other edge or side of the mandrel, as above described.

2. The construction and arrangement of the sliding frame T, for carrying or feeding up the steel plate upon the cone-mandrel, and having attached to it the table Q, self-adjustable to any required inclination for supporting and holding the steel plate while being drawn in upon the mandrel, and sustaining the adjustable rollers $n'$ $n$ with their adjustments to meet any required thickness of the steel plate.

3. The arrangement of the loose or sliding pressure roller U, so as to have the lateral motion upon the axle, $l$, by the means of the arms V V' attached to the sliding frame T, and the simultaneous graduated downward movement to press and guide the steel plate upon the spiral cone.

4. The combination of the sliding frame T and the parts attached to it and the pressure roller U and the intermediate guide plate 18 with the cone mandrel c, d, arranged and operating in a direct motion or reversed as described.

5. The arrangement by which the wheel G' is thrown in and out of gear so as to connect or disconnect the shaft L with the shaft S' by which, connection or disconnection may be made by hand or by the operation of the machine itself at the required moment, and in the manner and by the means above specified.

P. G. GARDINER.

Witnesses:
 J. B. STAPLES,
 RICHARD WINNE.